(12) United States Patent
Aoki et al.

(10) Patent No.: US 11,461,923 B2
(45) Date of Patent: Oct. 4, 2022

(54) CALCULATION SYSTEM, CALCULATION METHOD, AND STORAGE MEDIUM

(71) Applicant: KABUSHIKI KAISHA TOSHIBA, Tokyo (JP)

(72) Inventors: Yusuke Aoki, Yokohama (JP); Yojiro Tonouchi, Inagi (JP); Toshiaki Nakasu, Chofu (JP); Tomoyuki Shibata, Kawasaki (JP); Yuki Sakurai, Yokohama (JP); Akiko Kase, Yokohama (JP); Ryo Morinaga, Yokohama (JP); Masaki Iwasaki, Fuchu (JP); Sho Kawahata, Fuchu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/117,631

(22) Filed: Dec. 10, 2020

(65) Prior Publication Data
US 2021/0192771 A1    Jun. 24, 2021

(30) Foreign Application Priority Data

Dec. 11, 2019   (JP) .............................. JP2019-224034

(51) Int. Cl.
*G06T 7/70*    (2017.01)
*G06T 7/292*   (2017.01)
*G06V 40/10*   (2022.01)

(52) U.S. Cl.
CPC ................ *G06T 7/70* (2017.01); *G06T 7/292* (2017.01); *G06V 40/103* (2022.01); *G06T 2207/30196* (2013.01)

(58) Field of Classification Search
CPC .. G06T 7/70; G06T 7/292; G06T 7/32; G06T 7/73; G06T 2207/30196; G06K 9/00369;
(Continued)

(56) References Cited

U.S. PATENT DOCUMENTS 10,212,324 B2 *   2/2019  Uchiyama ............ H04N 5/2258
2010/0303302 A1 * 12/2010  Kipman ................. G06F 3/011
                                                        345/158

(Continued)

FOREIGN PATENT DOCUMENTS

JP          2005-250990 A      9/2005
JP          2017-91249 A       5/2017

*Primary Examiner* — Md K Talukder
(74) *Attorney, Agent, or Firm* — Oblon, McClelland, Maier & Neustadt, L.L.P.

(57) ABSTRACT

According to one embodiment, a calculation system includes a detector, a combiner, and a duration calculator. The detector refers to a plurality of images of an object imaged from mutually-different angles, detects the object in each of the images, and calculates a provisional position of the object in a coordinate system for each of the images. The coordinate system is prescribed. The combiner calculates a combined position of the object in the coordinate system by using the calculated plurality of provisional positions. The duration calculator refers to process information and a plurality of execution regions and calculates a duration of at least a portion of a plurality of processes based on the combined position and the execution regions. The process information includes information relating to the processes. The execution regions are represented using the coordinate system. The processes are executed in the execution regions.

15 Claims, 11 Drawing Sheets

(58) Field of Classification Search
CPC ...... G06V 40/103; G06V 10/50; G06V 40/10; G06V 20/10; G06N 3/0454
See application file for complete search history.

(56) References Cited

U.S. PATENT DOCUMENTS

| | | | |
|---|---|---|---|
| 2014/0233860 A1* | 8/2014 | Kis | G06T 7/73 |
| | | | 382/201 |
| 2015/0138236 A1* | 5/2015 | Koga | G06F 3/0304 |
| | | | 345/633 |
| 2015/0325004 A1* | 11/2015 | Utsunomiya | G06V 40/25 |
| | | | 382/103 |
| 2016/0055671 A1* | 2/2016 | Menozzi | H04N 5/23229 |
| | | | 701/300 |
| 2017/0132780 A1 | 5/2017 | Namioka et al. | |
| 2017/0193664 A1* | 7/2017 | Nishida | G06F 3/0418 |
| 2018/0018529 A1* | 1/2018 | Hiramatsu | G05D 1/0251 |
| 2019/0011269 A1* | 1/2019 | Matsushita | G01S 19/09 |
| 2020/0302641 A1* | 9/2020 | El-Sallabi | G06T 7/248 |
| 2021/0192771 A1* | 6/2021 | Aoki | G06V 40/103 |

* cited by examiner

| TIME | IMAGING DEVICE ID | COLOR | PERSON ID | x COORDINATE | y COORDINATE | CERTAINTY | ... |
|---|---|---|---|---|---|---|---|
| 9:00 | A | RED | 1 | 200 | 100 | 0.8 | ... |
| 9:00 | B | RED | 1 | 160 | 160 | 0.4 | ... |
| 9:00 | C | RED | 1 | 150 | 170 | 0.3 | ... |
| 9:00 | A | BLUE | 2 | 600 | 300 | 0.9 | ... |
| 9:00 | D | BLUE | 2 | 550 | 350 | 0.5 | ... |
| 9:00 | F | BLUE | 2 | 640 | 275 | 0.6 | ... |
| 9:01 | A | RED | 1 | 200 | 120 | 0.8 | ... |
| : | : | : | : | : | : | : | |

FIG. 5B

| TIME | COLOR | PERSON ID | x COORDINATE | y COORDINATE | CERTAINTY | ... |
|---|---|---|---|---|---|---|
| 9:00 | RED | 1 | 180 | 130 | 0.7 | ... |
| 9:00 | BLUE | 2 | 600 | 305 | 0.8 | ... |
| 9:01 | RED | 1 | 200 | 120 | 0.8 | ... |
| : | : | : | : | : | : | |

FIG. 6A

| PROCESS NAME | SCHEDULED START TIME | SCHEDULED FINISH TIME | SEQUENCE |
|---|---|---|---|
| PICKING | 15:00 | 15:05 | 1 |
| MOUNTING I | 15:05 | 15:15 | 2 |
| DE-SKINNING | 15:15 | 15:20 | 3 |
| MOUNTING II | 15:20 | 15:30 | 4 |

FIG. 6B

| TIME | COLOR | PERSON ID | WORK |
|---|---|---|---|
| 15:00 | RED | 1 | PICKING |
| 15:01 | RED | 1 | PICKING |
| 15:01 | BLUE | 2 | MOUNTING I |
| ... | ... | ... | ... |
| 15:30 | GREEN | 4 | MOUNTING II |

FIG. 6C

| PROCESS NAME | DURATION | | | | |
|---|---|---|---|---|---|
| | RED | BLUE | ... | GREEN | TOTAL |
| PICKING | 1:00 | 0:00 | ... | 0:00 | 1:00 |
| MOUNTING I | 3:00 | 1:45 | ... | 0:00 | 4:45 |
| DE-SKINNING, ETC. | 0:00 | 0:30 | ... | 1:30 | 2:00 |
| MOUNTING II | 0:00 | 0:30 | ... | 2:00 | 2:30 |

CALCULATION SYSTEM, CALCULATION METHOD, AND STORAGE MEDIUM

CROSS-REFERENCE TO RELATED APPLICATIONS

This application is based upon and claims the benefit of priority from Japanese Patent Application No. 2019-224034, filed on Dec. 11, 2019; the entire contents of which are incorporated herein by reference.

FIELD

Embodiments described herein relate generally to a calculation system, a calculation method, and a storage medium.

BACKGROUND

Conventionally, the durations of processes are managed to improve the productivity. Technology that can calculate the durations with higher accuracy is desirable.

DETAILED DESCRIPTION

According to one embodiment, a calculation system includes a detector, a combiner, and a duration calculator. The detector refers to a plurality of images of an object imaged from mutually-different angles. The detector detects the object in each of the plurality of images and calculates a provisional position of the object in a coordinate system for each of the plurality of images. The coordinate system is prescribed. The combiner calculates a combined position of the object in the coordinate system by using the calculated plurality of provisional positions. The duration calculator refers to process information and a plurality of execution regions. The duration calculator calculates a duration of at least a portion of a plurality of processes based on the combined position and the plurality of execution regions. The process information includes information relating to the plurality of processes. The execution regions are represented using the coordinate system. The processes are executed in the execution regions.

Various embodiments are described below with reference to the accompanying drawings.

In the specification and drawings, components similar to those described previously in an antecedent drawing are marked with like reference numerals, and a detailed description is omitted as appropriate.

Figure 1:
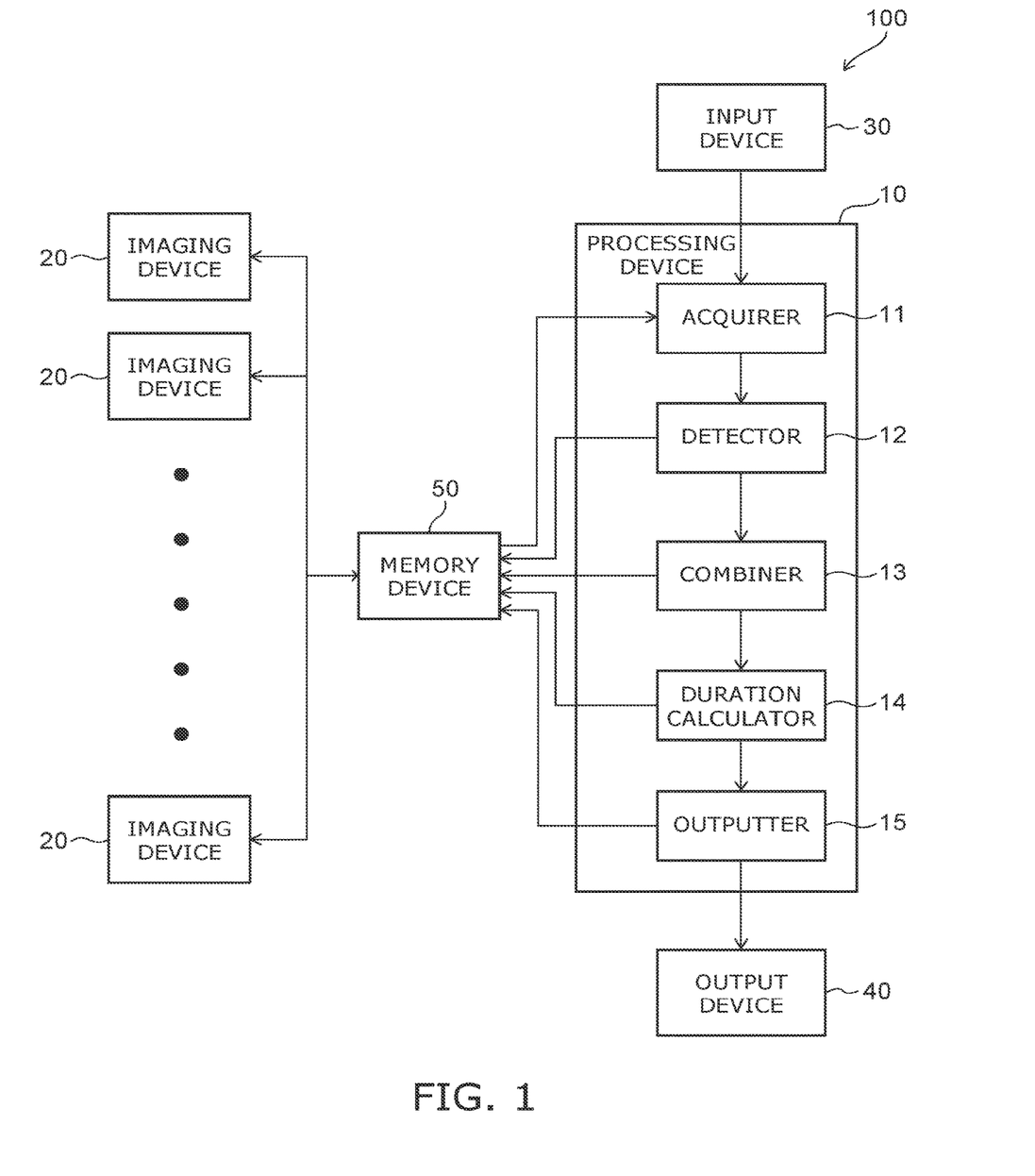
FIG. 1 is a schematic view illustrating a configuration of a calculation system according to an embodiment.

FIG. 1 is a schematic view illustrating a configuration of a calculation system according to an embodiment.

The calculation system 100 according to the embodiment is used to automatically calculate the time necessary for an object to execute a process.

As illustrated in FIG. 1, the calculation system 100 according to the embodiment includes an acquirer 11, a detector 12, a combiner 13, a duration calculator 14, and an outputter 15. The calculation system 100 also may include multiple imaging devices 20, an input device 30, an output device 40, and a memory device 50. In the example of FIG. 1, a processing device 10 functions as the acquirer 11, the detector 12, the combiner 13, the duration calculator 14, and the outputter 15.

The multiple imaging devices 20 acquire static images by imaging the object. Video images may be acquired by the imaging devices 20, and static images may be cut out from the video images. The multiple imaging devices 20 are provided at mutually-different positions. Also, the multiple imaging devices 20 image the object substantially simultaneously at the same time. Thereby, the object is imaged from mutually-different multiple angles at a designated time. The imaging devices 20 store the acquired images in the memory device 50. The imaging devices 20 are, for example, cameras.

The object may exist inside a building or outside a building. The calculation system 100 according to the embodiment may be used for a process executed indoors such as manufacturing inside a plant, installation work inside a building, etc. The calculation system 100 may be used for a process executed outdoors such as the assembly of a building, installation work outside a building, etc. The multiple imaging devices 20 may be provided indoors or outdoors according to the location where the object exists. For example, when the object executes a process inside a building, the multiple imaging devices 20 are mounted to walls or a ceiling of the building, equipment inside the building, etc. When the object executes a process outside a building, the multiple imaging devices 20 are mounted to exterior walls of the building, outdoor equipment, etc.

The object may be a person or a moving body. The moving body is a robot, an automated guided vehicle (AGV), etc. Hereinbelow, the case is described where the object mainly is a person.

The acquirer 11 accesses the memory device 50 and acquires stored images. Or, the images may be directly transmitted from the imaging devices 20 to the acquirer 11. The acquirer 11 transmits the acquired multiple images to the detector 12.

The detector 12 detects the object included in the images. The detector 12 calculates the position of the object based on the detection result. The position is represented using a prescribed two-dimensional coordinate system. Here, the positions of the object calculated from the images are called "provisional positions". Multiple provisional positions are calculated according to the number of images in which the object is visible. The detector 12 transmits the calculated multiple provisional positions to the combiner 13.

The combiner 13 uses the multiple provisional positions to calculate a combined position of the object. Here, the position of the object calculated from the multiple provisional positions is called a "combined position". The combined position is represented using the same coordinate system as the provisional positions. The combiner 13 transmits the calculated combined position to the duration calculator 14.

Process information that includes information relating to multiple processes and multiple execution regions is prestored in the memory device 50. The multiple execution regions refer to the regions where the multiple processes are executed. The execution regions are represented using the same coordinate system as the combined position. The process information includes character strings for identifying the processes. The process information may include the execution sequence of the multiple processes, scheduled times at which the processes are to be executed, data relating to the persons executing the processes, etc.

The duration calculator 14 refers to the process information and the multiple execution regions stored in the memory device 50. When the combined position is inside one of the execution regions, the duration calculator 14 determines that the process that corresponds to the execution region is being executed.

The duration calculator 14 may use data included in the process information in the determination. For example, when the process information includes scheduled times, the duration calculator 14 retrieves the process scheduled to be executed at the time at which the object exists at the combined position. When the duration calculator 14 finds the process, the duration calculator 14 compares the combined position and the execution region in which the process is executed. The duration calculator 14 determines that the process is being executed when the combined position is inside the execution region.

The acquisition of the images from the multiple imaging devices 20 is repeatedly executed at a prescribed interval. The detection of the object, the calculation of the provisional positions, the calculation of the combined position, and the determination of the execution of the process are repeatedly executed for the multiple images repeatedly acquired at the prescribed interval. The duration calculator 14 calculates, as the duration of the object for the process, the duration that the process is continuously determined to be executed. The duration calculator 14 transmits the calculated duration to the outputter 15.

The outputter 15 outputs data externally. For example, the outputter 15 outputs the calculated duration outside the processing device 10. The outputter 15 also may output at least one of the combined position, one or more of the calculated multiple provisional positions, or one or more of the imaged multiple images.

The outputter 15 may output data to the output device 40. The outputter 15 may output the data in a prescribed file format such as CSV, etc., or may output the data to a recording medium such as the memory device 50, an SD card, etc. Or, the outputter 15 may transmit the data to an external server by using FTP (File Transfer Protocol), etc. The outputter 15 may insert the data into an external database server by performing database communication and using ODBC (Open Database Connectivity), etc.

The input device 30 is used when a user inputs data to the processing device 10. The input device 30 includes at least one of a mouse, a keyboard, a microphone, or a touchpad. The acquirer 11 accepts the data input from the input device 30.

The user may input the process information, the execution regions, etc., by using the input device 30 and may store the process information, the execution regions, etc., in the memory device 50 via the processing device 10.

The output device 40 outputs the data to be recognizable by the user. The output device 40 includes at least one of a monitor, a projector, a printer, or a speaker. A device such as a touch panel that functions as both the input device 30 and the output device 40 may be used.

The processing device 10 includes a processing circuit that includes a central processing unit. The memory device 50 includes a hard disk drive (HDD), a solid-state drive (SSD), etc. The processing device 10, the multiple imaging devices 20, the input device 30, the output device 40, and the memory device 50 are connected to each other by wireless communication or wired communication. The processing device 10, the input device 30, the output device 40, and the memory device 50 may be embedded in one device.

Effects of the embodiment will now be described.

Conventionally, the duration is recorded by a monitoring personnel that monitors and measures the process. In this method, the measurement by the monitoring personnel requires much time. Also, the measurement results fluctuate according to the experience, perception, etc., of the monitoring personnel. There is also a method in which the duration is measured using images of the process imaged by one imaging device. In this method, there is a possibility that the position of the object cannot be accurately calculated when at least a portion of the object is hidden in a shadow. As a result, there is a possibility that the duration cannot be accurately calculated.

The multiple imaging devices 20 are used in the calculation system 100 according to the embodiment. The multiple imaging devices 20 are provided to image the object from mutually-different angles. Therefore, even when the object is hidden from one imaging device 20, the object can be imaged by another imaging device 20. By calculating the combined position by using multiple images from such multiple imaging devices 20, the position of the object can be calculated with higher accuracy. As a result, the duration that is based on the combined position also can be calculated with higher accuracy. Also, because the duration can be calculated from images that are automatically imaged, the labor of the monitoring personnel can be omitted.

A favorable specific example of the calculation system 100 will now be described.

Figure 2:
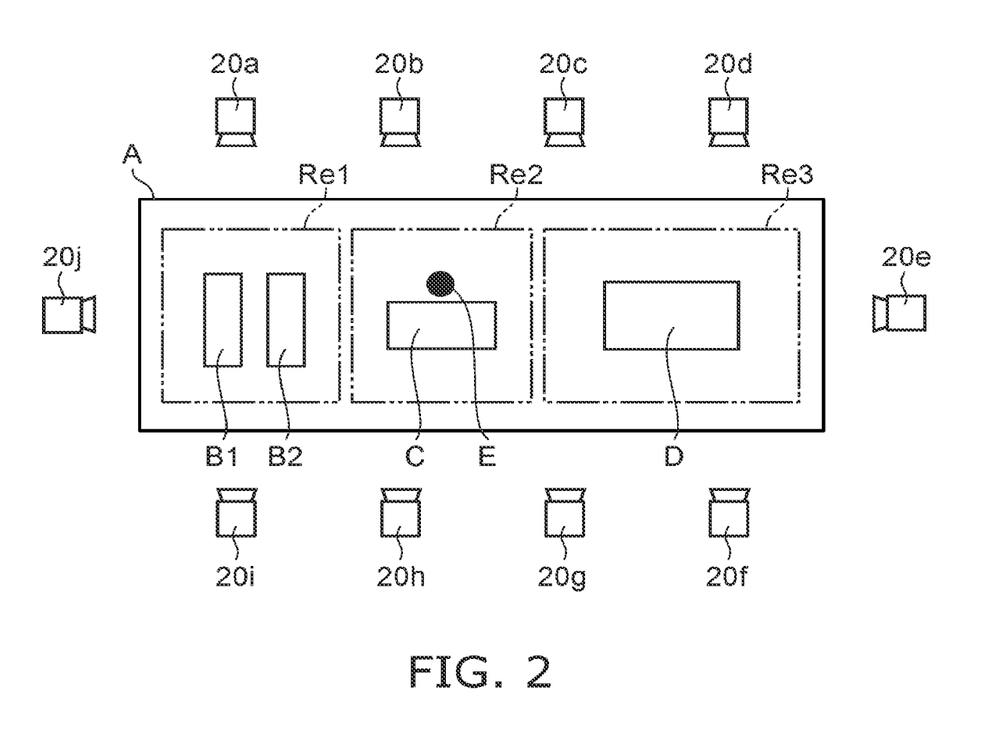
FIG. 2 is a schematic view illustrating an application example of the calculation system according to the embodiment.

FIG. 2 is a schematic view illustrating an application example of the calculation system according to the embodiment.

FIGS. 3A to 4B are schematic views for describing processing of the calculation system according to the embodiment.

Shelves B1 and B2, a desk C, and a work-in-process D are located in a workplace A illustrated in FIG. 2. Multiple imaging devices 20a to 20j are provided around these items. A person E, which is the object, executes a process in a location where at least one of the shelf B1, the shelf B2, the desk C, or the work-in-process D is located. The multiple imaging devices 20a to 20j image the workplace A and store images in the memory device 50.

A first model for detecting the object in the image is prestored in the memory device 50. The first model includes a neural network. Favorably, the first model includes a convolutional neural network (CNN). By using a CNN, the object can be detected with high accuracy in the images. The first model is pretrained to be able to detect the object in the images. Or, the detector 12 may detect the object in the images by using a single shot multibox detector (SSD) or regions with CNN features (R-CNN).

The detector 12 inputs the images to the first model and detects the object included in the images. Based on the detection result, the detector 12 cuts out portions of the images in which the object is visible. For example, rectangular portions of the images are cut out. The detector 12 stores the cut-out images in which the object is visible in the memory device 50. Also, the detector 12 stores, in the memory device 50, the positions in the images at which the object is cut out as detection regions.

Figure 3A:
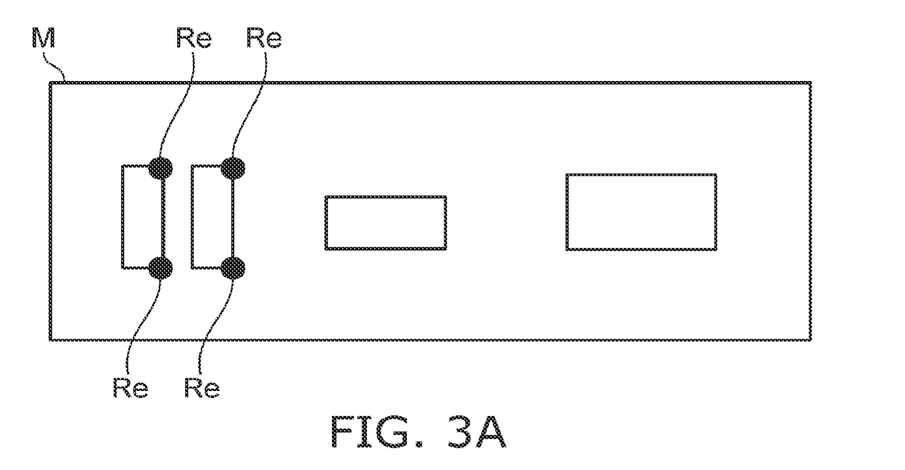
FIGS. 3A and 3B are schematic views for describing processing of the calculation system according to the embodiment.
Figure 3B:
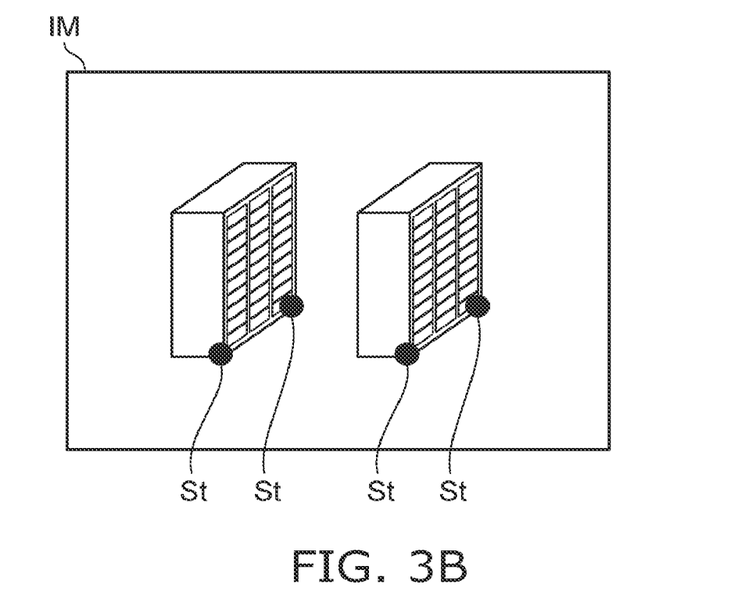

The detector 12 refers to map data represented using a two-dimensional coordinate system that is prestored in the memory device 50. FIG. 3A is a schematic view illustrating map data M. Multiple reference points Re are preset in the map data. FIG. 3B schematically illustrates an image acquired by one imaging device 20. Multiple control points St are preset in the images that are imaged by the imaging devices 20. Multiple reference points may be commonly set in the map data for the multiple imaging devices 20, or multiple reference points may be set in the map data for each of the imaging devices 20.

The multiple control points in the image are set to positions that correspond to the multiple reference points of the map data. The detector 12 converts the coordinate system of the image so that the multiple control points and the multiple reference points respectively match. A perspective projection transformation matrix can be used in the conversion. Thereby, the coordinates in each image can be represented using a common two-dimensional coordinate system.

The detector 12 calculates the position of the object in the image by using the grounded part of the object on the floor surface as a reference. When the object is a person, the grounded part is the feet. When the object is a moving body, the grounded part is a wheel, a crawler, etc. For example, the detector 12 uses the position of the center of the bottom side of the detection region as the position of the object in the image. The provisional position of the object in the common coordinate system is calculated by the coordinate system conversion described above.

When a person is detected as the object, the detector 12 may identify the person. A second model for identifying the person in the image is prestored in the memory device 50. The second model includes, for example, a neural network. Favorably, the second model includes a CNN. By using a CNN, the person can be identified with high accuracy. The second model is pretrained to be able to identify the person. Or, the detector 12 may identify the person by extracting histograms of oriented gradients (HOG) features from the image and inputting the HOG features to a support vector machine (SVM).

The detector 12 inputs the cut-out images to the second model. The detector 12 identifies the person included in the image to be the person corresponding to the class that obtained the highest confidence level. The detector 12 stores the identification result of the person and the confidence level in the memory device 50.

The person may wear a marker to make the identification by the detector 12 easy. The second model may identify the person by identifying the marker. For example, when the person wears a vest, the second model may identify the color of the vest, a printed character, etc. The detector 12 stores the identification result of the marker in the memory device 50 as the identification result of the person.

When calculating the provisional position of the object in the image, the detector 12 calculates the certainty of the provisional position. For example, a higher certainty means that the accuracy of the provisional position is higher. For example, the certainty is calculated using at least one of the following five values.

The first value is the confidence level of the identification result of the person. A higher confidence level means that the identification result of the person is more accurate. In other words, the person is more clearly visible in the image. The certainty is calculated to be higher as the confidence level increases.

The second value is the size of the object in the image. In other words, this is the size of the detection region. The object appears larger as the object becomes proximate to the imaging device 20. The accuracy of the provisional position increases as the object appears larger. Accordingly, the certainty is calculated to be higher as the size increases.

The third value is the distance between the object and the center of the image. For example, the detector 12 calculates the distance between the center of the image and the center of the detection region. The likelihood of the object being partially cut off from the image decreases as the distance decreases. The accuracy of the provisional position increases as the percentage of the object that is partially cut off decreases. Accordingly, the certainty is calculated to be higher as the distance decreases.

Figure 4A:
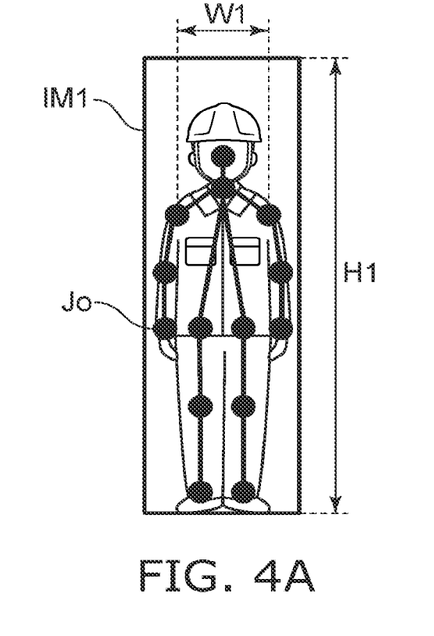
FIGS. 4A and 4B are schematic views for describing processing of the calculation system according to the embodiment.

The fourth value is a value that indicates the pose of the person. The detector 12 extracts skeleton data of the person from the cut-out image. FIG. 4A illustrates a cut-out image IM1 and the extracted skeleton data. Multiple joints Jo are extracted as the skeleton data. The detector 12 calculates a width W1 between the two shoulders. The detector 12 calculates a ratio R1 of the width W1 to a height H1 of the cut-out image. For example, a ratio R2 of a shoulder width W2 to a body height H2 when each person faces the front is prestored in the memory device 50. The detector 12 uses a ratio R3 of the ratio R1 to the ratio R2 as the value indicating the pose of the person. A large ratio R3 means that the person faces the front or the back in the image. As the person faces the front or the back, the likelihood of two hands and two feet of the person being visible increases, and the accuracy of the detection of the object increases. Accordingly, the certainty is calculated to be higher as the ratio R3 increases.

Figure 4B:
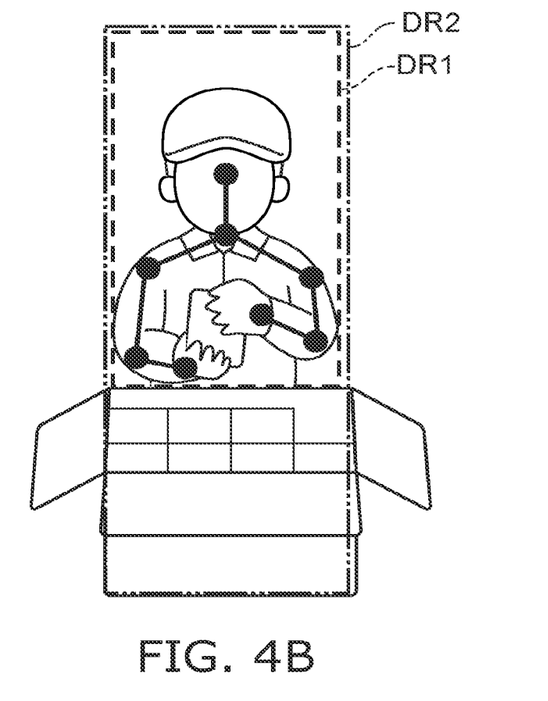

The fifth value is the exposure degree of the object in the image. FIG. 4B illustrates a portion of the image. In the example, the person is performing work, and a portion of the person is hidden. In such a case, the region in which the object is visible is detected as a detection region DR1. The detector 12 extracts the skeleton positions of the person visible in the detection region DR1 and estimates the positions of the skeleton that are hidden.

For example, a model for estimating the positions of the skeleton of the person and estimating the association of the joints based on the image is prestored in the memory device 50. OpenPose can be used as the model. The detector 12 uses the model to estimate the skeleton positions of the person including hidden skeletal parts. The detector 12 corrects the detection region based on the estimation result. A corrected detection region DR2 is the region where the person is estimated to be visible when there is no light-shielding object.

The detector 12 calculates the ratio of the surface area of the detection region DR1 to the surface area of the corrected detection region DR2 as the exposure degree. A higher exposure degree means that many parts of the object are visible. The accuracy of the detection of the object increases as the exposure degree increases. Accordingly, the certainty is calculated to be higher as the exposure degree increases.

The detector 12 calculates the certainty by using at least one of the five values described above. Favorably, the detector 12 calculates the certainty by using all of the five values. For example, the detector 12 uses the average of the five values as the certainty. Or, weights may be preset for the five values by considering the priorities of these values. The detector 12 may multiply each value by its weight and use the sum of the products as the certainty. The detector 12 calculates the certainty for each provisional position.

There are cases where an elevation difference exists in the workplace where the process is executed. When the object exists in a region that is higher than the floor surface, there is a possibility that the object in the image may be calculated to exist at a position that is more separated from the imaging device 20 than the actual position. When the object exists in a region that is higher than the floor surface, the position of the object in the image may be corrected by the amount of the elevation. For example, when the image that is acquired by the imaging device 20 includes a first region that is higher than the floor surface, the elevation and area of the first region are preset in the coordinate system in the image. When detecting the object in the image, the detector 12 determines whether or not the detection region of the object is included in the first region. When the detection region is included in the first region, the position of the detection region is shifted by the amount of the elevation.

As an example, the upper left of the image is set as the origin, and the detection region and the first region are rectangular. The coordinates of the opposite corners of the detection region are (x1, y1, x2, y2). The coordinates of the opposite corners of the first region are (X1, Y1, X2, Y2). The elevation from the floor surface of the first region is h. When the detection region is included in the first region, the coordinates of the opposite corners of the detection region after the correction are (x1, y1+h, x2, y2+h). The position of the object in the image can be calculated with higher accuracy by correcting the detection region according to the elevation from the floor surface.

As described above, the provisional position of the object is calculated using the position of the grounded part of the object on the floor surface. When the grounded part is hidden in a shadow and the provisional position is calculated using the position of another part of the object, there is a possibility that the accuracy of the provisional position may decrease. Therefore, when the grounded part of the object on the floor surface is hidden in a shadow, the detector 12 may estimate the position of the grounded part and correct the detection region. For example, the detector 12 extracts the skeleton data of the person and estimates the position of the hidden skeleton based on the extracted skeleton data. The detector 12 corrects the area of the detection region so that the detection region also includes the estimated skeleton. Thereby, the position of the object in the image can be calculated with higher accuracy.

The combiner 13 calculates the combined position by using the multiple provisional positions and the certainties of the provisional positions. For example, the combiner 13 uses the certainty as a weight. The combiner 13 normalizes the multiple certainties and multiplies the provisional positions by their certainties. The combiner 13 calculates the sum of the products as the combined position. By using the certainties to calculate the combined position, the combined position can be calculated with higher accuracy.

When calculating the combined position, the combiner 13 may calculate a combined certainty. For example, the combined certainty can be calculated based on the distance between the provisional positions. It is considered that the sureness of the combined position increases as the distance between the provisional positions decreases. Accordingly, the combined certainty is calculated to be higher as the distance between the provisional positions decreases.

Figure 5A:
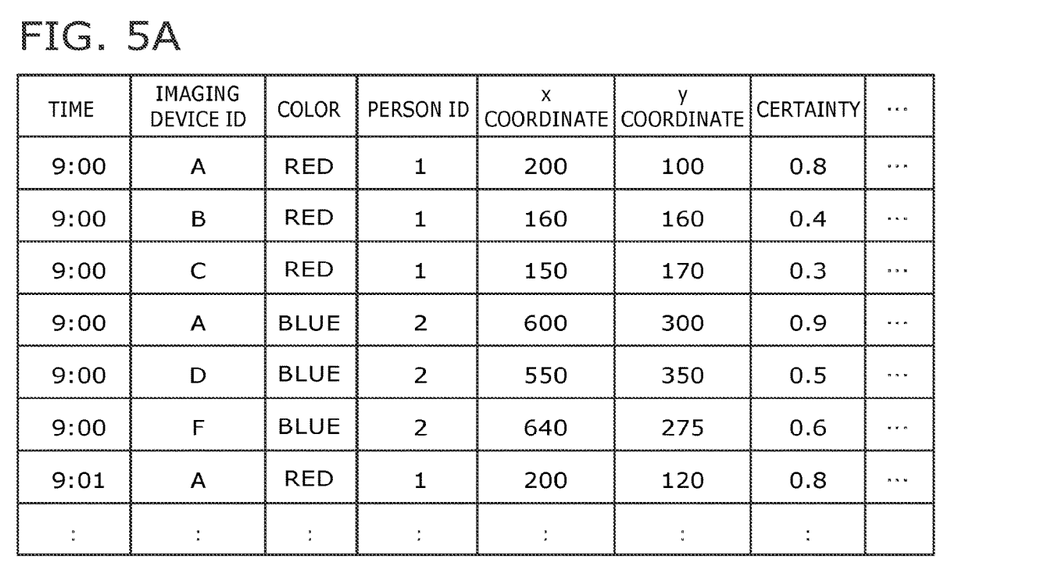
FIG. 5A is a table illustrating the output of the detector.
Figure 5B:
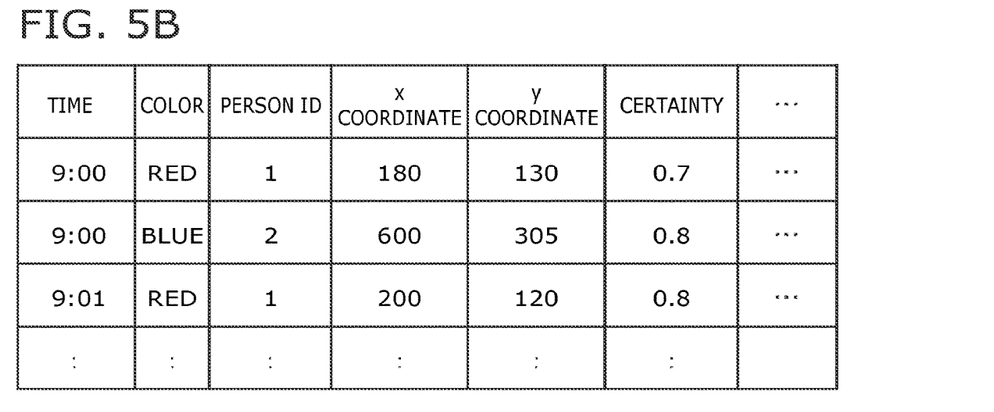
FIG. 5B is a table illustrating the output of the combiner.

FIG. 5A is a table illustrating the output of the detector. FIG. 5B is a table illustrating the output of the combiner.

In the example of FIG. 5A, a person that wears a red vest and a person that wears a blue vest are identified, and the provisional positions and the certainties are calculated for each. In the example, the output of the detector 12 includes the time, the identification data of the imaging device, the color and identification data as the identification result of the person, the coordinates of the provisional position, and the certainty. FIG. 5B illustrates the results of the combined positions calculated by the combiner 13 based on the output of FIG. 5A. In the example, the output of the combiner 13 includes the time, the color and identification data as the identification result of the person, the coordinate of the combined position, and the combined certainty. The detector 12 and the combiner 13 store these outputs in the memory device 50.

Figure 6A:
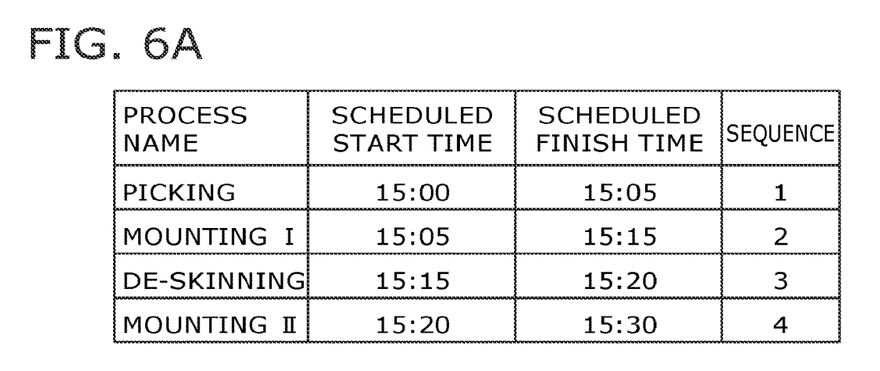
FIG. 6A is a table illustrating the process information.
Figure 6B:
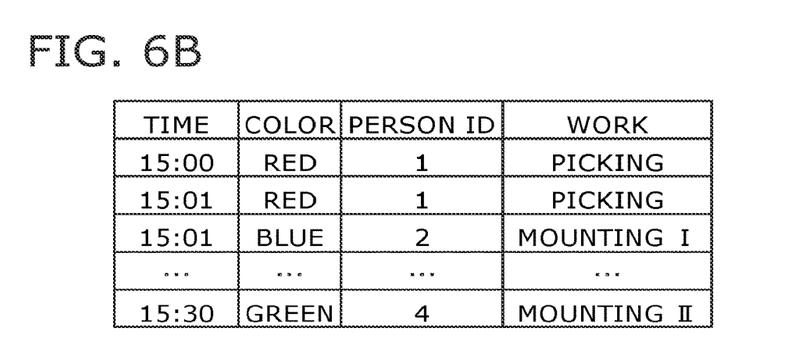
FIG. 6B is a table illustrating the determination result of the execution of the process.
Figure 6C:
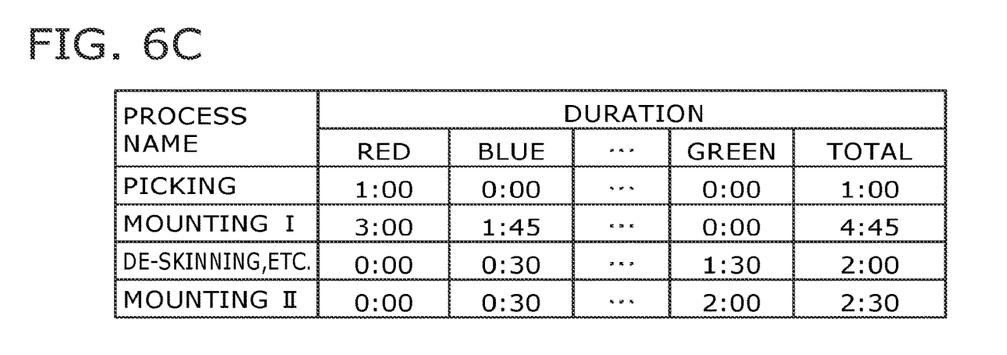
FIG. 6C is a table illustrating the calculation result of the duration of the process.

FIG. 6A is a table illustrating the process information. FIG. 6B is a table illustrating the determination result of the execution of the process. FIG. 6C is a table illustrating the calculation result of the duration of the process.

For example, the duration calculator 14 refers to the process information illustrated in FIG. 6A and the execution regions in which the processes are executed. In the example of FIG. 2, execution regions Re1 to Re3 are set at locations where the shelves, the desk, and the work-in-process are located.

In the example of FIG. 6A, the process information includes the process name, the scheduled start time, the scheduled finish time, and the execution sequence of the processes. For example, the execution sequence is automatically input based on the scheduled start times and the scheduled finish times of the processes. The duration calculator 14 refers to the execution region of the process initially executed and determines whether or not the combined position is inside the execution region. When the combined position leaves the execution region, the duration calculator 14 determines that the process is finished. The duration calculator 14 refers to the execution region of the process that is executed next and determines whether or not the combined position is inside the execution region. The execution of each process is determined by repeating this determination. When there are multiple objects, the execution of the process at each time is determined for each of the objects.

As illustrated in FIG. 6B, the duration calculator 14 determines the execution of the process at each time. Based on the determination result as illustrated in FIG. 6C, the duration calculator 14 calculates the duration of each process. When there are multiple objects, the duration calculator 14 calculates the duration of each process for each of the objects.

Figure 7:
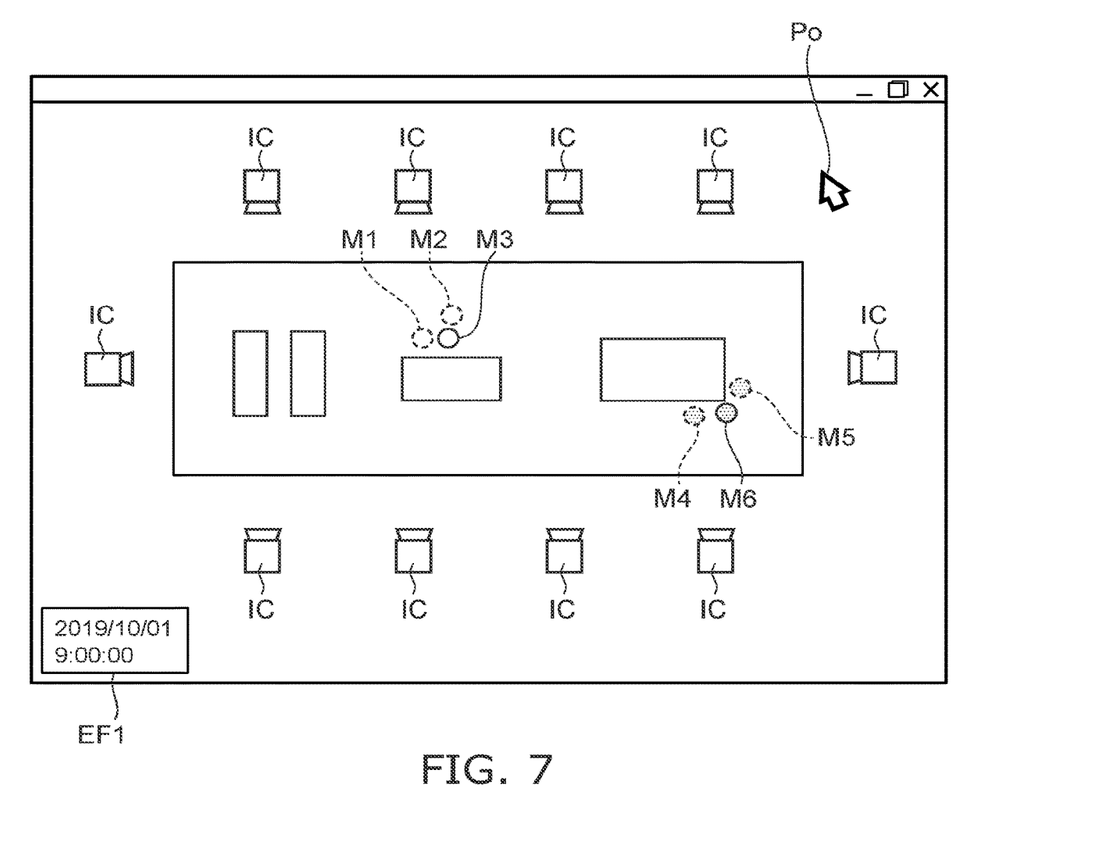
FIG. 7 is a schematic view illustrating an output example of the calculation system according to the embodiment.
Figure 8:
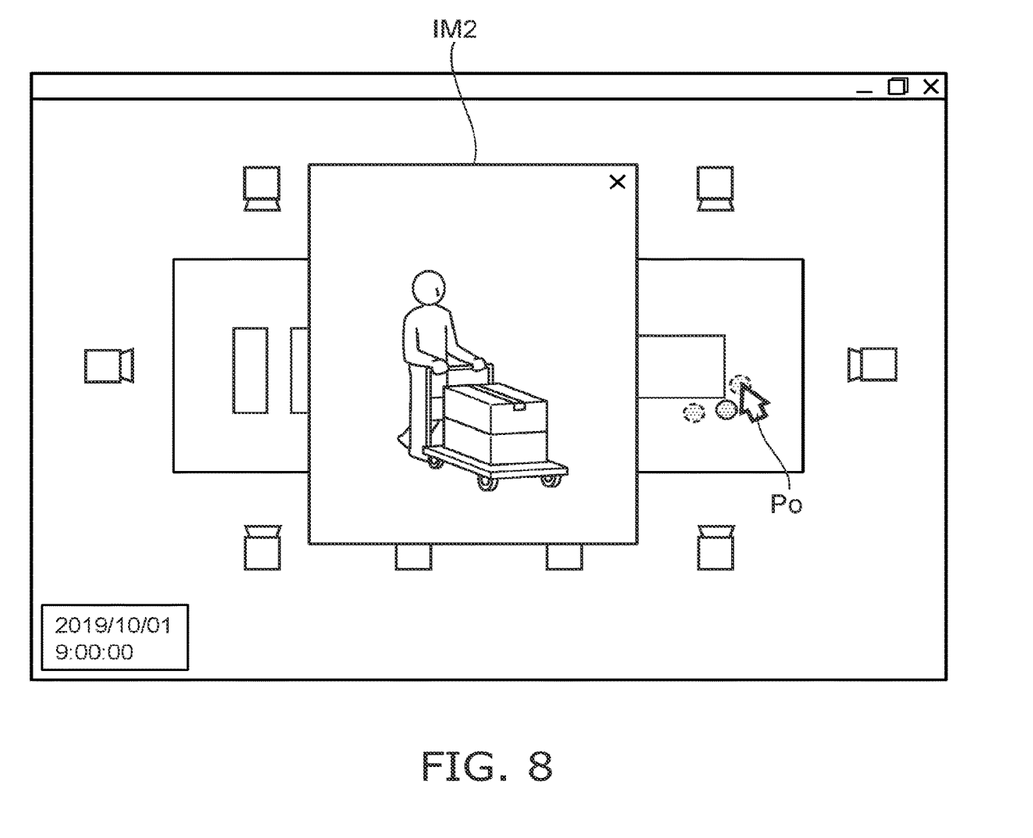
FIG. 8 is a schematic view illustrating an output example of the calculation system according to the embodiment.
Figure 9:
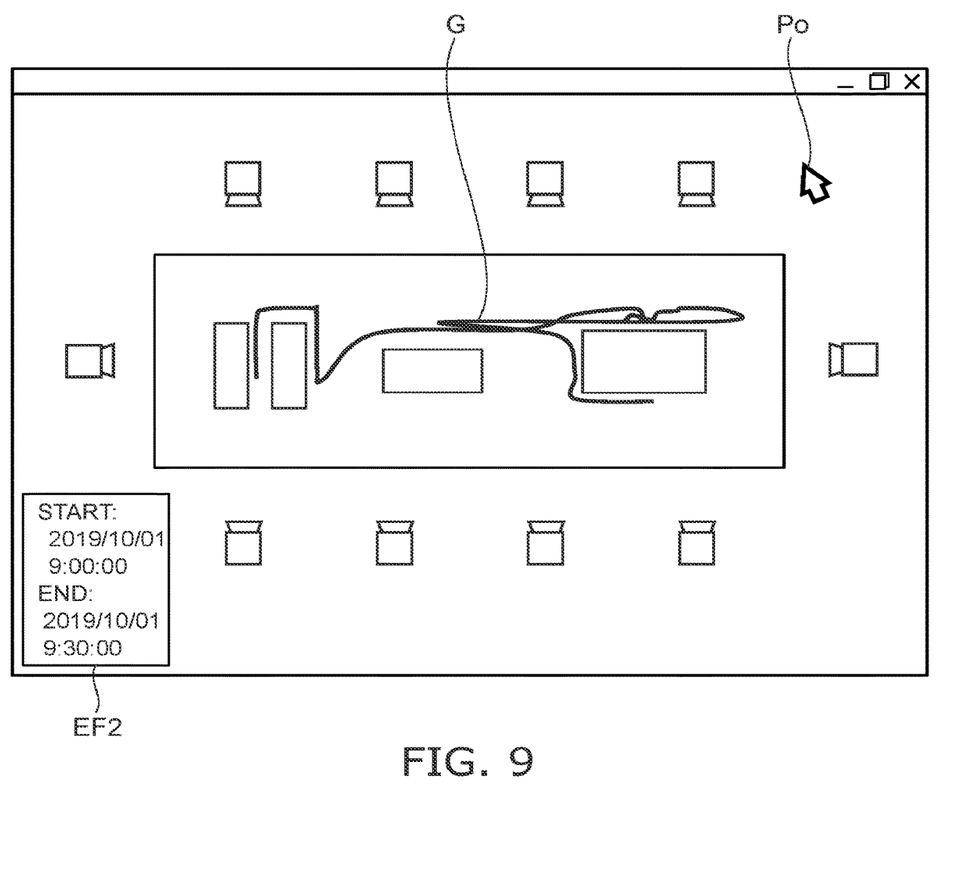
FIG. 9 is a schematic view illustrating an output example of the calculation system according to the embodiment.

FIGS. 7 to 9 are schematic views illustrating output examples of the calculation system according to the embodiment.

When the output device 40 is a monitor, the outputter 15 may cause the output device 40 to display a graphical user interface (GUI) and may cause the output device 40 to display the data in the GUI.

For example, in the screen illustrated in FIG. 7, a schematic view illustrating the manufacturing site and multiple icons IC that represent the multiple imaging devices 20 are displayed. Also, multiple marks M1 to M6 are displayed in the manufacturing site. In the example, the marks that are illustrated by broken lines are the provisional positions. The marks that are illustrated by solid lines are the combined positions. The marks M4 to M6 are filled with patterns, but the marks M1 to M3 are not filled with patterns. This shows that the object of the marks M4 to M6 is different from the object of the marks M1 to M3.

An input field EF1 for the time also is displayed in the screen. The user inputs, in the input field EF1, the time of the result that the user wants to confirm. The outputter 15 causes the screen to display the results related to the time that is input.

The user can operate a pointer Po by using the input device 30. For example, the user overlays and clicks the pointer Po on the icon IC of the imaging device 20. The outputter 15 causes the screen to display the image acquired by the designated imaging device 20 at the set time. For example, the user overlays and clicks the pointer Po on a mark of a provisional position. The outputter 15 retrieves the image used in the calculation of the provisional position and causes the screen to display the image. For example, as illustrated in FIG. 8, an image IM2 is displayed in the screen that displays the provisional position, the combined position, etc. The image IM2 may be displayed in another screen.

When the user clicks a combined position, a portion of the multiple images used in the calculation of the combined position is displayed in the screen. For example, when the combined position is clicked, the outputter 15 refers to the multiple certainties of the multiple provisional positions used in the calculation of the combined position. The outputter 15 selects the image in which the provisional position having the highest certainty was obtained, and causes the screen to display the image.

The likelihood is high that among the multiple images, the image in which the highest certainty is obtained provides easiest confirmation of the object. By selecting the image to be displayed based on the certainty, the user can easily confirm the output result of the calculation system 100.

The outputter 15 may cause the screen to display the transition of the combined position for a designated period. The transition of the combined position illustrates the movement path of the object. For example, as illustrated in FIG. 9, the user designates a period in an input field EF2. The outputter 15 refers to the combined positions at each time inside the period and displays a movement path G by continuously connecting the combined positions. By displaying the movement path G, it can easily be confirmed whether or not there is unnecessary movement of the object, etc.

When a portion of the movement path G is clicked, the outputter 15 may cause the display of the image that is imaged at the time that the object existed at the clicked position. At this time, similarly to the method described above, the outputter 15 selects the image to be displayed based on the multiple certainties.

Figure 10:
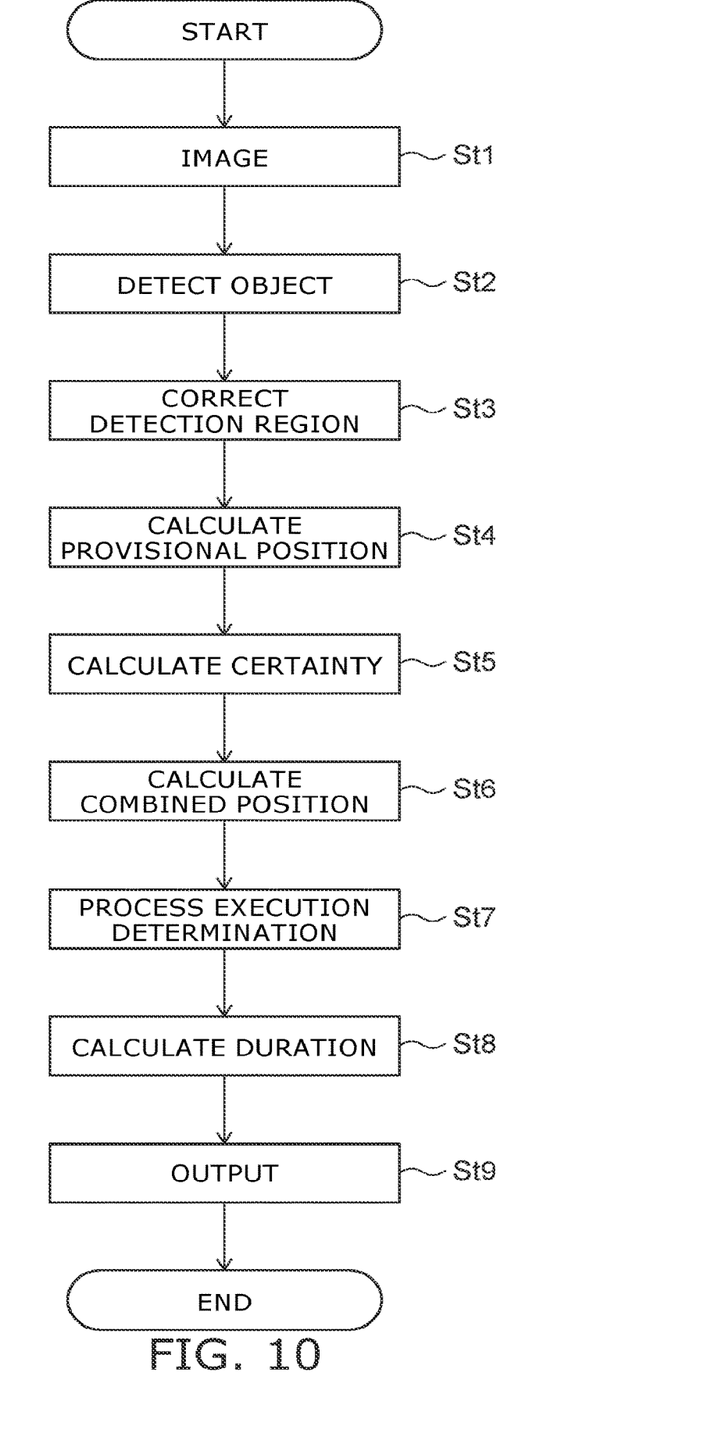
FIG. 10 is a flowchart illustrating a calculation method of a duration using the calculation system according to the embodiment.

FIG. 10 is a flowchart illustrating a calculation method of a duration using the calculation system according to the embodiment.

The multiple imaging devices 20 image the object (step St1). When the acquirer 11 acquires multiple images, the detector 12 detects the object in each image (step St2). The detector 12 corrects the detection regions (step St3). Specifically, the correction of the elevation difference from the floor surface, the correction based on the estimation of the grounded part, etc., are executed as appropriate. The detector 12 calculates the provisional positions in each detection region (step St4). The detector 12 calculates the certainties of the provisional positions (step St5). The combiner 13 calculates the combined position by using the multiple provisional positions and the multiple certainties (step St6). The duration calculator 14 determines the execution of the processes (step St7). Based on the determination result, the duration calculator 14 calculates the duration of each process (step St8). The outputter 15 outputs various results (step St9).

Figure 11:
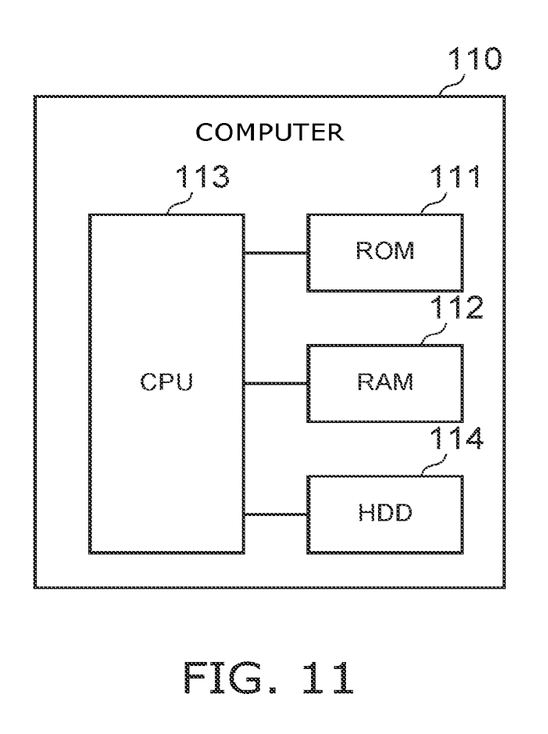
FIG. 11 is a block diagram illustrating a hardware configuration of the processing device.

FIG. 11 is a block diagram illustrating a hardware configuration of the processing device.

The processing device 10 of the calculation system 100 according to the embodiment is realized by a computer 110. The computer 110 includes read only memory (ROM) 111, random access memory (RAM) 112, a CPU 113, and a HDD 114.

The ROM 111 stores programs controlling the operations of the computer 110. The ROM 111 stores programs necessary for causing the computer 110 to realize the processing described above.

The RAM 112 functions as a memory region where the programs stored in the ROM 111 are loaded. The CPU 113 includes a processing circuit. The CPU 113 reads a control program stored in the ROM 111 and controls the operation of the computer 110 according to the control program. Also, the CPU 113 loads various data obtained by the operation of the computer 110 into the RAM 112. The HDD 114 stores data necessary for reading and data obtained in the reading process. The HDD 114 may function as the memory device 50.

Instead of the HDD 114, the computer 110 may include an embedded multi media card (eMMC), a solid-state drive, a solid state hybrid drive (SSHD), etc. The processing device 10 may be realized by collaboration between two or more computers.

By using the calculation system and the calculation method according to the embodiments described above, the duration of the process can be calculated with higher accuracy. Similar effects can be obtained by using a program for causing a computer to operate as the calculation system.

The processing of the various data described above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the data that is recorded in the recording medium can be read by a computer (or an embedded system). The recording format (the storage format) of the recording medium is arbitrary. For example, the computer reads the program from the recording medium and causes a CPU to execute the instructions recited in the program based on the program. The acquisition (or the reading) of the program by the computer may be performed via a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A calculation system, comprising:
a detector referring to a plurality of images of a person imaged from mutually-different angles, detecting poses of the person in each of the plurality of images, calculating a provisional position of the person in a coordinate system for each of the plurality of images, and calculating a plurality of certainties respectively for the plurality of provisional positions by using the poses, the coordinate system being prescribed;
a combiner calculating a combined position of the person in the coordinate system by using the plurality of provisional positions and the plurality of certainties; and
a duration calculator referring to process information and a plurality of execution regions and calculating a duration of at least a portion of a plurality of processes based on the combined position and the plurality of execution regions, the process information including information relating to the plurality of processes, the execution regions being represented using the coordinate system, the processes being executed in the execution regions.

2. The calculation system according to claim 1, further comprising:
an outputter outputting at least one of the combined position, one or more of the plurality of provisional positions, or one or more of the plurality of images.

3. The calculation system according to claim 2, wherein the outputter outputs a portion of the plurality of images based on the plurality of certainties.

4. The calculation system according to claim 2, wherein the outputter also outputs a change of the combined position over time.

5. The calculation system according to claim 1, wherein the detector identifies the person.

6. The calculation system according to claim 5, wherein the detector calculates each of the plurality of certainties by using at least one of
a confidence level of an identification result of the person,
a size of the person in the image,
a distance between the person and a center of the image,
a value indicating the pose of the person, or
an exposure degree of the person in the image.

7. The calculation system according to claim 1, wherein the detector
calculates the plurality of provisional positions in the coordinate system, the coordinate system being two-dimensional, and
corrects the plurality of provisional positions by using an elevation difference between a first region and a floor surface when the detected person is included in the first region, the first region being higher than the floor surface.

8. The calculation system according to claim 1, wherein when a grounded part of the person on a floor surface is not visible in the image, the detector estimates a position of the grounded part of the person of the image and calculates the provisional position based on a result of the estimation.

9. The calculation system according to claim 1, wherein the detector
detects the person and identifies the person for the plurality of images, and
calculates the provisional position for a plurality of persons when the plurality of persons is visible in the plurality of images, and p1 the combiner calculates the combined position for each of the plurality of persons.

10. The calculation system according to claim 1, wherein the process information includes times that the plurality of processes are executed, and
the duration calculator compares the combined positions at the times to the execution regions of the processes executed at the times and calculates durations that the combined positions are included in the execution regions as the durations of the at least a portion of the plurality of processes.

11. The calculation system according to claim 1, further comprising:
a plurality of imaging devices imaging the person from mutually-different angles.

12. A calculation method, comprising:
referring to, by processing circuitry, a plurality of images of a person imaged from mutually-different angles;
detecting, by the processing circuitry, poses of the person for each of the plurality of images;
calculating, by the processing circuitry, provisional positions of the person in a coordinate system, the coordinate system being prescribed;
calculating, by the processing circuitry, a plurality of certainties respectively for the plurality of provisional positions by using the poses;
calculating, by the processing circuitry, a combined position of the person in the coordinate system by using the plurality of provisional positions and the plurality of certainties;
referring to, by the processing circuitry,
process information including information relating to a plurality of processes, and
a plurality of execution regions represented using the coordinate system, the processes being executed in the execution regions; and
calculating, by the processing circuitry, a duration of at least a portion of the plurality of processes based on the combined position and the plurality of execution regions.

13. The method according to claim 12, wherein
the person is detected,
the person is identified, and
each of the plurality of certainties is calculated by using at least one of
a confidence level of an identification result of the person,
a size of the person in the image,
a distance between the person and a center of the image,
a value indicating the pose of the person, or
an exposure degree of the person in the image.

14. A non-transitory computer-readable storage medium storing a program,
the program causing a computer to
refer to a plurality of images of a person imaged from mutually- different angles, detect poses of the person for each of the plurality of images, calculate provisional positions of the person in a coordinate system, the coordinate system being prescribed, calculate a plurality of certainties respectively for the plurality of provisional positions by using the poses, calculate a combined position of the person in the coordinate system by using the plurality of provisional positions and the plurality of certainties, refer to
- process information including information relating to a plurality of processes, and
- a plurality of execution regions represented using the coordinate system, the processes being executed in the execution region, and calculate a duration of at least a portion of the plurality of processes based on the combined position and the plurality of execution regions.

15. The non-transitory computer-readable storage medium according to claim 14, wherein
the program causes the computer to
detect the person and identify the person, and
calculate each of the plurality of certainties by using at least one of
- a confidence level of an identification result of the person,
- a size of the person in the image,
- a distance between the person and a center of the image,
- a value indicating the pose of the person, or
- an exposure degree of the person in the image.

* * * * *